United States Patent Office 3,294,725
Patented Dec. 27, 1966

3,294,725
METHOD OF POLYMERIZING SILOXANES AND SILCARBANES IN EMULSION BY USING A SURFACE ACTIVE SULFONIC ACID CATALYST
Donald E. Findlay and Donald R. Weyenberg, Midland, Mich., assignors to Dow Corning Corporation, Midland, Mich., a corporation of Michigan
No Drawing. Filed Sept. 13, 1965, Ser. No. 487,036
51 Claims. (Cl. 260—29.2)

This application is a continuation-in-part of abandoned application Serial Number 330,240 filed December 13, 1963, which is a continuation-inpart of abandoned application Serial Number 271,485 filed April 8, 1963.

This invention relates to emulsion polymerization of organosiloxanes and silcarbanes. More specifically, this invention relates to a new method of polymerizing organosiloxanes and silcarbanes in emulsion.

The preparation of emulsions of high molecular weight organopolysiloxanes can be accomplished by first dissolving the polysiloxane in an organic solvent and then emulsifying the solution. This method has the disadvantage inherent in the use of solvents and further the emulsions are not particularly stable.

A method of preparing organopolysiloxane in emulsion is disclosed in U.S. Patent 2,891,920, wherein the polymerizing agents are strong bases or strong mineral acids. While this method produces excellent polysiloxane emulsions, the strong mineral acids present a problem in neutralization and/or removal. Further, for best results a separate emulsifying agent is employed in the said method.

It is an object of the present invention to provide a new method for polymerizing organosiloxanes and silcarbanes in emulsion. A further object is to provide a method of preparing stable organopolysiloxane latex emulsions. These and other objects will become apparent from the following description.

This invention relates to a method which comprises polymerizing and copolymerizing (1) at least one member selected from the group consisting of organosiloxanes of the unit formula $R_nSiO_{4-n/2}$ in which R is selected from the group consisting of hydrogen atoms, monovalent hydrocarbon radicals and monovalent halohydrocarbon radicals and $n$ has an average value of from 0.5 to less than 3, and silcarbanes having the general formula $HO(R)_2SiQSi(R)_2OH$ wherein R is selected from the group consisting of hydrogen atoms, monovalent hydrocarbon radicals and monovalent halohydrocarbon radicals and Q is a divalent radical attached to both silicon atoms via a silicon-carbon bond, said Q being selected from the group consisting of radicals composed of carbon and hydrogen atoms and radicals composed of carbon, hydrogen and oxygen atoms, there being less than 15 carbon atoms in said Q radical and any oxygen that is present being in the form of ether linkages, by polymerizing said member in an aqueous medium while in a dispersed state in the presence of (2) a surface active sulfonic acid catalyst, until the desired increase in molecular aggregation is obtained.

In carrying out the method of this invention the siloxane and surface active sulfonic acid catalyst are dispersed in water to form a stable emulsion. The emulsion is then allowed to stand with or without agitation at the desired temperature until the siloxane has reached the desired state of molecular aggregation. Alternatively, the surface active sulfonic acid catalyst can be added to the water first and the siloxane thereafter emulsified, or the siloxane can be emulsified and the surface active sulfonic acid catalyst then added and the polymerization allowed to proceed as above. In this latter method, emulsification of the siloxane can be aided, if desired, by the use of a nonionic or anionic emulsifying agent. This is of course not necessary, and any desired means can be employed to bring the siloxane into aqueous emulsion, such as violent mechanical agitation, ultrasonic vibration or any other suitable technique. In addition, the surface active sulfonic acid catalysts of ths invention are themselves excellent emulsifying agents for this system.

It should be understood that it is not essential to have or form a pre-emulsion of the siloxane or silcarbane to be polymerized. The polymerization and emulsification processes can be taking place essentially simultaneously. By way of illustration, the siloxane or silcarbane can be added to an aqueous solution of the catalyst with agitation, the siloxane or silcarbane being emulsified as it is polymerized. It is obvious, of course, that when employing this technique it is desirable that the siloxane or silcarbane being polymerized have a high surface area in order to get reasonable reaction rates. Thus, when polymerizing solid silcarbanes it is preferable to employ them in finely divided form.

It should also be understood that the siloxane can be generated in situ in the emulsion by adding hydrolyzable silanes such as alkoxysilanes to the water. Under these conditions, the silanes will hydrolyze and partially condense to siloxanes which will proceed to polymerize in accordance with this invention. However, when this method is used, care should be taken that the amount of alcohol generated is not sufficient to break the emulsion. When it is desirable to employ more than 10% by weight of an alkoxysilane, say up to 30 or 40%, it is generally preferable to slowly add the alkoxysilane, with agitation, to a mixture of the surface active sulfonic acid catalyst and water.

Also, this invention relates to a method for polymerizing and copolymerizing organosiloxanes of the unit formula $R_nSiO_{4-n/2}$ in which R is selected from the group consisting of hydrogen atoms, monovalent hydrocarbon radicals and monovalent halohydrocarbon radicals and $n$ has an average value of from 0.5 to less than 3, which method comprises preparing an aqueous solution of a surface active sulfonic acid, heating the resulting solution to a temperature in the range of about 20° C. to reflux, then slowly adding an alkoxysilane or a mixture of alkoxysilanes to the heated aqueous surface active sulfonic acid solution, with agitation, and then continuing the agitation, while maintaining the temperature in the above specified range, until the desired increase in molecular aggregation is obtained.

This invention also relates to a method for preparing hexaphenylcyclotrisiloxane which comprises polymerizing diphenylsilanediol in the presence of a surface active sulfonic acid catalyst.

This invention also relates to a method which comprises polymerizing and copolymerizing (1) at least one member selected from the group consisting of organosiloxanes of the unit formula $R_nSiO_{4-n/2}$ in which R is selected from the group consisting of hydrogen atoms, monovalent hydrocarbon radicals and monovalent halohydrocarbon radicals and $n$ has an average value of from 0.5 to less than 3, and silcarbanes having the general formula

wherein R is selected from the group consisting of hydrogen atoms, monovalent hydrocarbon radicals and monovalent halohydrocarbon radicals, by polymerizing said member, in an aqueous medium while in a dispersed state, in the presence of (2) a surface active sulfonic acid catalyst, until the desired increase in molecular aggregation is obtained.

This invention still further relates to a method which comprises polymerizing and copolymerizing silcarbanes having the general formula

wherein R is a member selected from the group consisting of hydrogen atoms, monovalent hydrocarbon radicals and monovalent halohydrocarbon radicals, in an aqueous medium, by polymerizing said silcarbanes while in a dispersed state in the presence of a surface active sulfonic acid catalyst, until the desired increase in molecular aggregation is obtained.

In the silcarbanes the divalent Q radical can be, for example, p-phenylene, M-phenylene, p-xenylene, p-xylylene, p-diphenylene ether, p-dimethylenediphenyl ether, methylene, ethylene, propylene, butylene, pentamethylene, dipropylene ether and butylidene radicals.

Polymerization of the siloxanes proceeds satisfactorily at room temperature but can be carried out at any desired temperature. Preferably, of course, this should be below the boiling point of water although, if desired, temperatures above 100° C. can be employed if the polymerization is carried out in a closed system. The preferred temperature range is from 25° to 90° C.

It should be noted that, with respect to the silcarbanes having the general formula

that heat causes increased conversion to the emulsion phase and in some instances such silcarbanes can be advantageously polymerized at reflux temperature with a very high percentage of polymer being obtained in the emulsion phase. Also, the use of an additional emulsifying agent causes increased conversion to the emulsion phase. Moreover, it was quite unexpected that some of these materials could be emulsion polymerized at all because they are solids. These factors are particularly illustrated by the table in Example 22.

The time of polymerization is not critical but will vary depending upon the speed of the reaction and the viscosity desired in the resulting siloxane. It has been found that as the polymerization proceeds the viscosity of the siloxane will increase and the average size of the emulsion droplets decreases. A combination of these two processes is believed to result in the extremely stable emulsions obtained by the method of this invention.

The concentration of the siloxane with respect to the water is not critical. All that is required is that the dispersion be a siloxane in water. Thus, so long as there is enough water to give a continuous aqueous phase the polymerization will proceed in accordance with this invention. Polymerizations can be carried out at siloxane concentrations of one percent by weight or less.

When polymerization is complete the siloxane can be recovered from the emulsion by breaking it in any desired fashion, such as by the addition of salts such as sodium chloride or by evaporation of the water or by the addition of water-soluble alcohols such as methanol, ethanol or isopropanol. When the emulsion is broken by the addition of salts or alcohols, the polymer is obtained relatively catalyst free.

If desired, the emulsion can be neutralized with any alkaline material such as ammonium hydroxide, sodium hydroxide, potassium carbonate or lithium bicarbonate, by adding an amount sufficient to render the emulsion to a pH near 7. This neutralization is not necessary, however, particularly if the polysiloxane is to be recovered by removal from the emulsion per the above.

Any silcarbane having the general formula $$HO(R)_2Si-Q-Si(R)_2OH$$

or any organosiloxane of the unit formula $R_nSiO_{4-n/2}$ in which formulae R, Q and $n$ are as defined above can be employed in the method of this invention. Preferably, $n$ has a value of about 2 or from 1.9 to 2.1. Thus, it can be seen that the siloxanes employable herein range from resinous materials having an average of about one-half R group per silicon up to endblocked fluid polymers having an average of greater than two R groups per silicon. The viscosity of the starting siloxane is not critical. If the viscosity is too high for adequate dispersion of the siloxane, a small amount of solvent can be employed which can subsequently be removed, if desired, before polymerization is begun. As pointed out above, the silcarbanes employed herein can be solids. It should be understood that the method of this invention applies equally well to the preparation of homopolymeric siloxanes and to the preparation of copolymeric siloxanes. Thus, for example, one might polymerize an organosiloxane of the formula $R_2SiO$ such as dimethylsiloxane or one can copolymerize mixtures of siloxanes of the formulae $SiO_2$, $RSiO_{1.5}$, $R_2SiO$ and $R_3SiO_{.5}$, or one might polymerize a silcarbane of the formula $HO(R)_2Si-Q-Si(R)_2OH$, or one might copolymerize mixtures of silcarbanes having this formula, or one might copolymerize mixtures of these siloxanes and silcarbanes.

The term "unit formula" means that the siloxane is essentially of the formula shown but that the polymer can also contain some silicon-bonded OH groups or some silicon-bonded hydrolyzable groups such as alkoxy, acyloxy or oxime groups, etc.

For the purpose of this invention R in the above formulae can be any monovalent hydrocarbon radical such as alkyl radicals such as methyl, ethyl, propyl, octadecyl and myricyl; alkenyl radicals such as vinyl, allyl, methallyl, hexanyl and butadienyl; cycloaliphatic radicals such as cyclobutyl, cyclohexyl, cyclopentenyl, and cyclohexadienyl; aryl hydrocarbon radicals such as phenyl, tolyl, naphthyl, mesityl, thymyl and xenyl; and aralkyl hydrocarbon radicals such as benzyl, benzhydryl, α-mesityl and β-phenylpropyl; halogenated monovalent hydrocarbon radicals such as chlorophenyl, α,α,α-trifluorotolyl, trifluorovinyl, trifluorochlorocyclobutyl, 3,3,3-trifluoropropyl and tetrabromoxenyl. The R groups can also be hydrogen atoms although preferably there should not be more than one hydrogen atom per silicon.

The polymerization catalyst is compound (2) above, which is a surface active sulfonic acid. There are a wide variety of sulfonic acids that can be employed in the processes of this invention. In order to perform satisfactorily the sulfonic acid must have the proper balance of water and oil solubility. This solubility is, of course, determined to a large extent by the hydrocarbon portion of the compound. Illustrative of the sulfonic acids useful in this invention are the aliphatically substituted benzenesulfonic acids, the aliphatically substituted naphthalenesulfonic acids, the aliphatic sulfonic acids, siliylalkylsulfonic acids and the aliphatically substituted diphenylethersulfonic acids. Generally speaking, the aliphatic substituents contain at least 6 carbon atoms, and preferably contain no more than about 18 carbon atoms. The preferred catalysts at this time are the aliphatically substituted benzenesulfonic acids of the formula

wherein R' is a monovalent aliphatic hydrocarbon substituent of at least 6 carbon atoms. Thus, suitable aliphatic substituents R' include hexyl, octyl, decyl, dodecyl, cetyl, myricyl, nonenyl, phytyl and pentadecadienyl. Preferably the R' radical has at least 8 inclusive carbon atoms, and most preferably at least 10. The R' radical can be straight or branched chain. The R' substituents are also illustrative of the substituents that can be present in the other sulfonic acids useful herein.

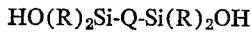

Catalyst (2) can be a single compound or a mixture of two or more compounds, each member of the mixture falling within the above recited definition. In practice mixtures are generally employed, since these high molecular weight acids are difficult to purify to a single specie, and also because mixtures function quite as well as single compounds. Commercially available materials, generally billed as single compounds, are usually mixtures wherein the average molecular configuration is as described above as the one configuration of the composition. For example, material sold as dodecylbenzenesulfonic acid is a mixture containing substituted benzenesulfonic acids ranging from perhaps nonyl to pentadecyl, but averaging dodecyl (i.e. twelve carbon atoms per R group). Thus, in this specification reference to the size of the aliphatic chain on the substituted benzenesulfonic acid is to the average length as per the above explanation unless otherwise specified.

It will be obvious to those skilled in the art that the catalyst (2) can be formed in situ from a salt, such as the sodium salt, of the aliphatic substituted benzenesulfonic acid and an acid if so desired.

The concentration of catalyst can vary from as little as 0.01 part by weight per 100 parts of silcarbane or siloxane and upward, if desired. Generally, it is preferred, for a practical reaction rate, to employ at least 0.1 part by weight. Any amount can be employed, although it is obviously wasteful to employ a large quantity of catalyst when a small amount will suffice. The use of large amounts of catalyst (2) can lead to difficulty in its removal when this is desired. Excellent results are obtained when the concentration of (2) is from about 0.1 to about 5 parts of catalyst per 100 of silcarbane or siloxane.

As stated earlier, no emulsifying agent is needed to give stable emulsions with catalyst (2) as it serves this function as well. However, a nonionic or anionic emulsifying agent can be employed if so desired. Such nonionic emulsifying agents as saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine, and anionic emulsifying agents as alkali metal sulforicinates, sulfonated glyceryl esters of fatty acids, salts of sulfonated monovalent alcohol esters, amides of amino sulfonic acid such as the sodium salt of oleyl methyl tauride, sulfonated aromatic hydrocarbon alkali salts such as sodium α-naphthalene monosulfonate, condensation products of naphthalene sulfonic acids with formaldehyde, and sulfates such as ammonium lauryl sulfate, triethanol amine lauryl sulfate and sodium lauryl ether sulfate can be employed, if desired. It has been found that the alkali metal salts, particularly the sodium salts, of the acid catalyst of this invention are particularly useful when additional emulsifying agent is desired. This is particularly true where silica fillers are to be employed as shown infra.

The emulsions prepared by the method of this invention are characterized by extreme stability and extremely fine particle size. The dispersed particles of siloxane are so small that they cannot be resolved under an optical microscope. The stability of the emulsions is exemplified by the fact that they stand for years without separating and they can be centrifuged at 2,000 r.p.m. for 30 minutes without any sign of separation and can be diluted to almost any concentration without separation.

The emulsions of this invention can be employed for release agents or for coating compositions. The method of this invention is particularly adaptable for the preparation of latex paints. For example, the emulsion can be mixed with the desired pigment or other fillers and then applied to a surface where the water will evaporate leaving a continuous coating.

It should be understood that the utility of the method of this invention is not limited to the production of emulsions but the invention can also be employed to facilitate production of siloxane polymers which can be recovered by breaking the emulsion.

In a particular embodiment of this invention an emulsion polymer is prepared by the method of this invention from a siloxane essentially of the average formula

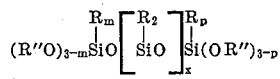

wherein R has the meaning already given, R″ is a lower alkyl radical, i.e. methyl through hexyl inclusive, m and p are each integers of from 0 to 3 inclusive, the sum of m and p being not greater than 5, and x has an average value of at least 7. This composition emulsifies readily and polymerizes to a polysiloxane which does not appear to be gelled, but which when removed from the emulsion, does gel to a crosslinked rubber. Fillers can be added to the polymerized composition while it is yet an emulsion so that the strength of the rubber resulting from coagulation of the emulsion is further improved. These fillers are best added as aqueous dispersions, such as colloids or emulsions. Preferably the filler is a silica filler, although any dispersible filler can be used, provided its addition does not cause breaking of the polysiloxane emulsion.

The emulsion, either with or without the added filler(s), is quite stable, and can be diluted, if desired, with more water. For maximum stability of the emulsion it is desirable to neutralize the acid catalyst in the emulsion with a base (e.g. NaOH, NH$_4$OH, K$_2$CO$_3$ and LiHCO$_3$), to a pH of approximately 7. This can be done either prior to or after the addition of filler, although in some cases it is desirable to neutralize the acid catalyst before the filler is added. This particular system provides an excellent method of obtaining, for example, coatings of tough rubbery siloxane films for release coatings.

It should be understood that fillers can be included in any of the emulsions of this invention. Also, finely divided abrasives such as diatomaceous earth can be incorporated in those emulsions to be employed as polishes.

The following examples are illustrative only and should not be construed as limiting the invention. The viscosity of the siloxanes shown in the following examples refers to the viscosity of the siloxanes per se, and not to that of the emulsions. The viscosities of the siloxanes were determined by separating the siloxane from the emulsion and determining its viscosity by the usual methods. All viscosities are measured at 25° C. The molecular weights of the polymerized silcarbanes were determined from intrinsic viscosity measurements.

EXAMPLE 1

150 g. of dimethylsiloxane cyclics, 5 g. of the sodium salt of dodecylbenzenesulfonic acid, 2 g. of dodecylbenzenesulfonic acid and 333 g. of water were placed in a reactor and, with vigorous stirring, heated to 80° C. and held at that temperature with continued stirring for 24 hours. The system becoming an excellent emulsion within three hours. After the 24 hour polymerization time, the emulsion was neutralized to a pH of 7.8 by adding sodium carbonate. The viscosity of the fluid polysiloxane was about 8,000 cs., and was found to contain 13 percent by weight of cyclic material.

EXAMPLE 2

A mixture of 350 g. dimethylsiloxane cylcics, 5 g. of dodecylbenzenesulfonic acid and 645 g. of water was homogenized by passing it through a homogenizer at 4,000 p.s.i. The emulsion, in a closed container, was placed in an air circulating oven operating at 70° C.

Fractions of the emulsion were removed at intervals as shown below, and the siloxane characterized as to viscosity and percent cyclic material remaining. In each case the sample taken was neutralized with sodium carbonate to a pH of about 7.

| Hours | Vs., cs. | Percent cyclics |
|---|---|---|
| 24 | 27,200 | 13.4 |
| 48 | 32,800 | 10.5 |
| 120 | 33,190 | 8.8 |

EXAMPLE 3

Following the procedure of Example 2, a mixture of 3.4 g. of hexamethyldisiloxane, 556.6 g. dimethylsiloxane cyclics, 8.0 g. of dodecylbenzenesulfonic acid and 1032.0 g. of water were homogenized at 4,000 p.s.i., polymerized at 70° C., and portions taken after the times as shown below and neutralized with sodium carbonate, and the viscosity and percent cyclics determined on the polysiloxane.

| Hours | Vs., cs. | Percent cyclics |
|---|---|---|
| 4 | 660 | 18.5 |
| 6 | 800 | 13.4 |
| 24 | 790 | 14.0 |
| 48 | 610 | 13.4 |

EXAMPLE 4

Various emulsions were made as per the preceding examples, of the composition 35 percent by weight dimethylsiloxane cyclics, 1 percent by weight of the sodium salt of dodecylbenzenesulfonic acid, from 0.1 to 1.0 percent of dodecylbenzenesulfonic acid (as shown in the table below), the balance being water. These emulsions were made by homogenizing at 4000 p.s.i. Polymerization was by heating 24 hours at 70° C. as in Example 2. The emulsions were neutralized with sodium carbonate.

| Percent acid | Vs., cs. | Percent cyclics |
|---|---|---|
| 0.1 | 3,291 | 47.2 |
| 0.3 | 27,210 | 16.3 |
| 0.5 | 76,000 | 12.3 |
| 0.7 | 60,790 | 12.8 |
| 1.0 | 64,000 | 9.7 |

EXAMPLE 5

In this example the use of a triorganoalkoxysilane is illustrated as an endblocking agent. A mixture of 3.28 g. of trimethylmethoxysilane, 556.72 g. of dimethylsiloxane cyclics, 8.0 g. of dodecylbenzenesulfonic acid and 1,032 g. of water were homogenized at 4,000 p.s.i., the resulting emulsion was heated 24 hours at 70° C., and thereafter neutralized with sodium carbonate to a pH of about 7. The polysiloxane was recovered from the emulsion, and was found to have a viscosity of 1,612 cs. with a cyclics content of 7.6 percent. That the fluid has been endstopped with trimethylsiloxane groups is shown by the lower viscosity as compared to the 24 hour sample of Example 2.

EXAMPLE 6

A mixture of 560 g. of dimethylsiloxane cyclics, 8 g. of dodecylbenzenesulfonic acid, and 1032 g. of water was homogenized at 4,000 p.s.i. Portions of this resulting emulsion were heated for 24 hours at the temperatures as shown, and thereafter neutralized to a pH of about 7 with sodium carbonate. Viscosity and cyclics were determined as before.

| Temp., °C. | Vs., cs. | Percent cyclics |
|---|---|---|
| 50 | 120,000 | 10.1 |
| 70 | 23,200 | 10.1 |
| 90 | 7,275 | 10.0 |

EXAMPLE 7

In this example copolymers were prepared employing the diorganosiloxane cyclics as shown in the table below. For each sample there was employed a total of 35 percent by weight of the siloxane cyclics, 0.5 percent by weight of dodecylbenzenesulfonic acid, 1.0 percent by weight of the sodium salt of dodecylbenzenesulfonic acid and 63.5 percent by weight of water. The emulsions were formed by the usual homogenization procedure. Polymerizations were carried out for the time shown below at 70° C. and the sample taken at the end of the stated times were neutralized with sodium carbonate.

| Sample | Dimethyl- siloxane cyclics, g. | Methylvinyl siloxane cyclics, g. | 1 Day | | 2 Days | | 5 Days | |
|---|---|---|---|---|---|---|---|---|
| | | | Visc. | Percent cyclics | Visc. | Percent cyclics | Visc. | Percent cyclics |
| 1 | 0 | 280 | 750 | 44.6 | 9,700 | 22.7 | 18,650 | 17.7 |
| 2 | 70 | 210 | 5,300 | 24.6 | 19,650 | 18.2 | 24,000 | 17.1 |
| 3 | 140 | 140 | 14,650 | 13.1 | 25,300 | 15.4 | 28,300 | 15.4 |
| 4 | 210 | 70 | 18,500 | 15.4 | 26,700 | 16.0 | 31,300 | 16.0 |
| 5 | 252 | 28 | 20,500 | 15.4 | 27,200 | | 29,100 | 16.0 |

EXAMPLE 8

A mixture of 140 g. of dimethylsiloxane cyclics, 210 g. of a trimethylsilyl-endblocked methylhydrogenpolysiloxane having a viscosity of 100 cs., 5 g. of dodecylbenzenesulfonic acid, and 645 g. of water was homogenized and then polymerized one day at 70° C. After neutralization with ammonium hydroxide the emulsion was evaluated as a cloth treatment agent. The water repellency of the treated fabric was improved.

EXAMPLE 9

This run is shown for comparison.

A mixture of 175 g. of dimethylsiloxane cyclics, 2.5 g. of toluenesulfonic acid and 322.5 g. of water was homogenized and heated at 70° C. The emulsion broke almost immediately. There was no evidence of polymerization of the dimethylsiloxane. This shows that benzenesulfonic acids having little or no aliphatic substitution do not operate as polymerizing catalysts in this system.

EXAMPLE 10

Three samples were prepared of varying percentages of phenylmethylsiloxane cyclics and dimethylsiloxane cyclics as shown in the table below. Each sample contained a total of 175 g. of siloxane, 2.5 g. of dodecylbenzenesulfonic acid, 5 g. of the sodium salt of dodecylbenzenesulfonic acid and 317.5 g. of water. Each mixture was homogenized, and polymerization allowed to proceed at 70° C. for the times indicated in the table below. Viscosity and percentage cyclic measurements on the polysiloxane were made as usual.

| Sample | Mol percent | | 2 Days | | 7 Days | | 14 Days | |
|---|---|---|---|---|---|---|---|---|
| | Phenylmethyl-siloxane | Dimethyl-siloxane | Visc. | Percent cyclic | Visc. | Percent cyclic | Visc. | Percent cyclic |
| 1 | 100 | 0 | (¹) | 68.8 | 460 | 22.5 | 600 | 16.3 |
| 2 | 50 | 50 | (²) | 20.8 | 8,250 | 14.0 | 10,700 | |
| 3 | 10 | 90 | 22,700 | 15.1 | 22,500 | 12.8 | 22,400 | 12.8 |

¹ Not sufficient sample for viscosity measurement due to high percentage cyclics.
² Some polymerization, sample lost before viscosity measurement could be made.

EXAMPLE 11

In this example, a similar procedure to the preceding example was employed except that the phenylmethylsiloxane cyclics were replaced by 3,3,3-trifluoropropylmethylsiloxane cyclics as shown in the table below, and polymerization was for the times shown.

| Sample | Mol Percent | | 2 Days | | 5 Days | | 14 Days | |
|---|---|---|---|---|---|---|---|---|
| | [CF$_3$CH$_2$CH$_2$(CH$_3$)SiO] | (CH$_3$)$_2$SiO | Visc. | Percent cyclic | Visc. | Percent cyclic | Visc. | Percent cyclic |
| 1 | 50 | 50 | (¹) | 60.4 | 4,350 | 30.0 | 12,600 | 19.7 |
| 2 | 10 | 90 | 20,325 | 10.5 | 24,200 | 11.7 | 23,250 | 16.8 |

¹ Not sufficient sample for viscosity measurement due to high percentage cyclics.

EXAMPLE 12

A mixture of 175 g. of dimethylsiloxane cyclics, 2.5 g. of octylbenzenesulfonic acid and 322.5 g. of water was homogenized in the usual way, heated at 70° C. for the times listed below, and samples taken at the intervals stated and neutralized with sodium carbonate. Viscosity and percentage cyclic determinations are listed below.

| Polymerization | Viscosity, cs. | Percent cyclics |
|---|---|---|
| 24 hours | 25,200 | 12.8 |
| 2 days | 23,300 | 15.1 |
| 6 days | 23,150 | 16.2 |

EXAMPLE 13

This run is shown for comparison.

In this example the catalyst was 2.5 g. of butylbenzenesulfonic acid instead of the catalyst of the preceding example. The mixture separated quickly before homogenization. After homogenization the emulsion has 1/16 inch of oil on its surface. The sample was heated at 70° C., and after 2 hours at this temperature the emulsion had broken completely. There was no evidence of polymerization. There was then added two percent by weight of a nonionic emulsifying agent (the condensation product of 2,4,8-trimethyl-6-nonanol and approximately 6 mols per mol of the alcohol of ethylene oxide), and the mixture rehomogenized. The emulsion which resulted become oily on the surface during subsequent heating at 70° C. for 6 days. Infrared analysis indicated that no linear material was formed even after 6 days at 70° C.

EXAMPLE 14

A mixture of 30 parts of a hydroxyl-endblocked dimethylpolysiloxane having a viscosity of 70 cs., 2 percent of the nonionic emulsifying agent, made by reacting tridecanol with ethylene oxide in the ratio of one mol of the alcohol to about 10 mols of the oxide, and 68 percent of water was emulsified by homogenizing at 4,000 p.s.i. There was added to the above emulsion 0.5 percent of dodecylbenzenesulfonic acid. The emulsion was then allowed to stand at room temperature (approximately 25° C.), and samples withdrawn at the time intervals shown below. After neutralization with sodium carbonate, the polysiloxane was recovered from the said samples and viscosity measured.

Time, days: Visc., cs.
2 _____ 90,319
5 _____ 123,300
8 _____ 304,000
16 _____ 608,000
32 _____ 640,000

EXAMPLE 15

This run is shown for comparison.

In this example the same emulsion was used as was made in Example 14, except that there was added, in place of the dodecylbenzenesulfonic acid, 0.5 percent of toluene-sulfonic acid. The resulting emulsion was allowed to stand at room temperature for 6 days. The emulsion was broken by adding denatured alcohol. The viscosity of the recovered siloxane was 104 cs. indicating that little or no polymerization had occurred in this time. Since some fractionation of the siloxane is obtained by this emulsion breaking technique, it would be expected that there would be a higher viscosity obtained. The results from this experiment should be compared to that of Example 14, wherein the active catalyst of this invention produced, in 5 days, a fluid having a viscosity of over 100,000 cs.

EXAMPLE 16

A hydroxylated essentially dimethylpolysiloxane of about 40 cs. viscosity was reacted with an excess of methyltrimethoxysilane to give a fluid having at the hydroxyl substituents methyldimethoxysilyl radicals replacing the hydrogen. An emulsion was prepared with 30 percent by weight of this fluid, 2 percent by weight of the nonionic emulsifying agent of Example 13 and 68 percent of water, employing the usual homogenization technique. There was added to this an emulsion 0.5 percent of dodecylbenzenesulfonic acid. The emulsion was allowed to stand at room temperature for 60 minutes and then neutralized with sodium carbonate. Upon breaking a sample of the emulsion there was obtained a polysiloxane fluid which rapidly gelled. The polysiloxane while in emulsion was found by nuclear magnetic resonance measurements to be a non-gelled fluid.

To a portion of the emulsion was added a colloidal silica sol having a pH of 8.5 and an approximate particle diameter of 7 m$\mu$ such that there was about 20 parts by weight of silica per 100 parts of polysiloxane. This addition of a new emulsion did not affect the polysiloxane emulsion. Upon breaking the mixed emulsion, there was obtained a tough rubbery film. This film is suitable for coating surfaces such as paper, cloth, etc., for such as release coatings.

EXAMPLE 17

A mixture of 3.5 g. of methyltrimethoxysilane, 346.5 g. of dimethylsiloxane cyclics, 5 g. of dodecylbenzenesulfonic acid, 10 g. of the sodium salt of dodecylbenzenesulfonic acid and 635 g. of water was homogenized to an emulsion and thereafter heated at 70° C. A sample of emulsion was withdrawn after 18 hours and the polysiloxane recovered therefrom, which polysiloxane was a fluid. After 24 hours of heating the polysiloxane recovered was a stringy fluid, showing some gelation. After 4 days, the polysiloxane obtained was a somewhat drier gel-like fluid. The polymer was a copolymer of dimethylsiloxane and monomethylsiloxane.

To a second portion of emulsion that had been polymerized for 24 hours there was added a small amount of the silica sol of Example 16. This sample was then neutralized with ammonium hydroxide and the emulsion filmed out on kraft paper and the water removed by evaporation, leaving a semi-tacky polysiloxane coating.

A second portion of emulsion which had been allowed to polymerize for 4 days was neutralized with ammonium hydroxide and there was added thereto a small amount of silica sol of Example 16. A portion of the emulsion was filmed out on kraft paper, as above and dried by heating for one minute at 300° F. The resulting rubbery coating had little or no tack, did not transfer to cellulose tape and gave good release.

EXAMPLE 18

This run is given for comparison.

The emulsion of this example has the same composition as the emulsion in Example 16. To a portion of this emulsion there was added 0.1 percent of toluenesulfonic acid. The emulsion broke in less than 2 hours. To another portion of the above emulsion was added 0.5 percent of toluenesulfonic acid. This emulsion broke in 30 minutes. In neither case was there observed any polymerization of the siloxane.

EXAMPLE 19

In this example the emulsion was the same as in Example 17 except that the methyltrimethoxysilane of that example was replaced by the same weight of methyltriethoxysilane. The same quantity of the same polymerization catalyst was added, and polymerization allowed to proceed as in that example. After 24 hours of polymerization time, the polysiloxane was a stringy fluid. After 3 days polymerization time it was a drier gel-like fluid. After the three days polymerization, a portion of the emulsion was neutralized with ammonium hydroxide and silica sol of Example 16 was added thereto in an amount to give 20 parts of silica per 100 parts of polysiloxane. The resulting emulsion was applied to kraft paper as in the preceding example, dried for one minute at 300° F., which gave a strong, tough film showing good release characteristics. A portion of the polysiloxane emulsion was allowed to polymerize an additional 3 days. This portion was then neutralized as above, the silica sol added, and this emulsion applied to kraft paper, giving results similar to above.

EXAMPLE 20

An emulsion was prepared containing 16.3 g. of phenyltrimethoxysilane, 543.7 g. of dimethylsiloxane cyclics, 8.0 g. of dodecylbenzenesulfonic acid, 16 g. of the sodium salt of that acid and 1016 g. of water. The emulsion was heated at 70° C. for the times shown below. This procedure gives a copolymer of dimethylsiloxane and monophenylsiloxane which copolymer polymerized further as shown. Portions were removed at the indicated times, neutralized with sodium carbonate, and the silica sol of the preceding example added to give a silica to polysiloxane ratio of 1:5 by weight. A smaller portion of the emulsion was also removed at the times indicated in order to observe the nature of the polymer. The observation of both polymer and film, the latter made in the same manner as the two preceding examples, are given in the table below.

| Time | Polymer | Film |
| --- | --- | --- |
| 24 hours | Soft, tacky gel | Continuous, not very tough. |
| 2 days | ----do---- | Excellent tough film. |
| 4 days | ----do---- | Excellent, very tough elastic film. |

EXAMPLE 21

35 grams of diphenylsilanediol, 65 grams of water and 0.5 gram of dodecylbenzenesulfonic acid were placed in an 8 ounce bottle. The bottle was capped and the mixture then agitated continuously on a rotating wheel for 23 days. The solids were then removed by filtration, washed with water, and dried. Infrared analysis of this solid showed that it contained 65% of hexaphenylcyclotrisiloxane.

EXAMPLE 22

This example illustrates the use of varying conditions and quantities of reactants in the reaction. The procedures employed were as follows:

(A) *Room temperature reactions.*—The reactants, catalyst and emulsifying agent (if any) were placed in a bottle and the mixture then agitated on a rotating wheel for the specified time.

(B) *Elevated temperature reactions.*—The reactants, catalyst and emulsifying agent (if any) were placed in a flask, heated to the specified temperature, and then stirred vigorously for the specified time. In reaction 14, the water, catalyst and emulsifying agent were first placed in a flask and heated to reflux temperature. Then the solid para-bis(hydroxydimethylsilyl)benzene was added through a side-arm over a period of 20 minutes, and then the mixture refluxed for 1 hour.

Whether the reactions were carried out at room temperature (rt) or at elevated temperature, after the reaction was finished, the solid phase was removed by filtration, washed and then dried. The emulsion phase was first neutralized with sodium carbonate solution, and then the polymer recovered by methanol precipitation and dried. The molecular weights of the polymers recovered from both phases were determined by intrinsic viscosity measurements.

The specific reactants, their quantities, the reaction conditions and the results for the various reactions are set forth in the table below.

TABLE

| Reaction | Grams HO(CH$_3$)$_2$Si-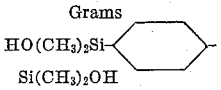-Si(CH$_3$)$_2$OH | Grams Water | Grams Catalyst [1] | Grams Emulsifying Agent [2] | Time | Temp., °C | Solid Phase Percent [3] | Solid Phase M.W. | Emulsion Phase Percent [3] | Emulsion Phase M.W. |
|---|---|---|---|---|---|---|---|---|---|---|
| 1 | 35 | 65 | 0.5 | 0.5 | 19 days | rt | 72 | 200,160 | 28 | 632,000 |
| 2 | 70 | 130 | 1.0 | | {16 hrs.[4] / 78 hrs.[4]} | {70 / rt} | 48 | 64,221 | 52 | 207,550 |
| 3 | 210 | 390 | 3.0 | 3.0 | 6 hrs | 70 | 43.7 | 102,760 | 46.3 | 165,400 |
| 4 | 35 | 65 | 0.5 | 0.5 | 1 hr | 70 | 31 | | 69 | 104,170 |
| 5 | 35 | 65 | 0.5 | 0.5 | 2 hrs | 70 | 28 | | 71.6 | 94,956 |
| 6 | 35 | 65 | 0.5 | 0.5 | 4 hrs | 70 | 33 | | 66.5 | 160,840 |
| 7 | 35 | 65 | 0.5 | 0.5 | 1 hr | 90 | 33 | | 67 | 154,675 |
| 8 | 35 | 65 | 0.5 | 0.5 | 4 hrs | 90 | 27 | | 73 | 158,560 |
| 9 | 35 | 65 | 0.5 | 1.0 | 1 hr | 90 | 45.9 | | 54.1 | |
| 10 | 35 | 65 | 0.5 | 2.0 | 1 hr | 90 | 34.6 | | 65.4 | |
| 11 | 35 | 65 | 0.5 | 4.0 | 1 hr | 90 | 39.2 | | 60.8 | |
| 12 | 51.8 | 48.2 | 0.5 | 5.9 | 1 hr | 90 | 39.2 | | 60.8 | |
| 13 | 35 | 65 | 0.5 | 1.0 | 1 hr | Reflux | 20 | | 80 | |
| 14 | 120 | 80 | 1.0 | 1.0 | 1 hr | do | <4.5 | | >95 | |

[1] Dodecylbenzenesulfonic acid (Sulfonic 100).
[2] Sodium salt of dodecylbenzenesulfonic acid (Siponate DS-10).
[3] Percent of the starting diol accounted for in the specified phase.
[4] This reaction run 16 hours at 70° C. then aged 78 hours at room temperature.

EXAMPLE 23

68.5 g. of water and 1.5 g. of dodecylbenzenesulfonic acid were added to a 500 cc. flask equipped with a stirrer, condenser, addition funnel and temperature controller. The aqueous solution of dodecylbenzenesulfonic acid was heated to 50° C. and then 30 g. of propyltrimethoxysilane was slowly added, with agitation, over a period of 2-3 hours. The temperature was maintained at about 50° C. during the process. A translucent suspension, which was stable on standing, was obtained. This suspension was neutralized with ammonium hydroxide and then broken with isopropyl alcohol. A high viscosity fluid polymer was obtained. Heating of this high viscosity fluid polymer in a 150° C. oven for several days resulted in formation of a brittle solid.

The above process was repeated employing 30 g. of each of the silanes specified below instead of the propyltrimethoxysilane. The indicated type of polymeric product was then obtained upon breaking the suspension.

Silane: Product
  Methyltrimethoxysilane _____ solid.
  Amyltrimethoxysilane _____ fluid.
  Dimethyldimethoxysilane _____ fluid.

EXAMPLE 24

89.5 g. of water and 0.5 g. of dodecylbenzenesulfonic acid were added to a flask equipped with a stirrer, condenser, addition funnel and temperature controller. The aqueous solution of dodecylbenzenesulfonic acid was heated to 50° C. and then 10 g. of vinyltrimethoxysilane was slowly added, with agitation, over a period of 2-3 hours. The temperature was maintained at about 50° C. during the process. A translucent suspension, which was stable on standing, was obtained. This suspension was neutralized with ammonium hydroxide and then broken with isopropyl alcohol. A solid polymer was obtained.

EXAMPLE 25

208.5 g. of water and 1.5 g. of dodecylbenzenesulfonic acid were added to a flask equipped with stirrer, condenser, addition funnel and temperature controller and then heated to about 56° C. Then 90 g. of phenyltrimethoxysilane was slowly added, with agitation, to the heated aqueous solution of dodecylbenzenesulfonic acid over a period of 2-3 hours. The temperature was maintained at about 56° C. during the process. A translucent suspension, which was stable on standing, was obtained. Upon neutralization and breaking of the suspension a solid polymer was obtained.

EXAMPLE 26

350 g. of dimethylsiloxane cyclics, 15 g. of hexylsulfonic acid and 635 g. of distilled water were mixed and then homogenized twice at 4000 p.s.i. The emulsified siloxanes were then polymerized for 24 hours at 70° C. followed by 5 hours at 50° C. and then neutralized with triethanolamine. While there was oiling of the emulsion, the viscosity did increase, clearly indicating siloxane polymerization had taken place.

EXAMPLE 27

280 g. of dimethylsiloxane cyclics, 12 g. of dodecylsulfonic acid and 508 g. of distilled water were mixed and then homogenized at 4000 p.s.i. The emulsified siloxanes were then polymerized and neutralized as in the preceding example. Very little oiling of the emulsion occurred. The viscosity of the resulting siloxane polymer was about 97,700 cps.

EXAMPLE 28

The procedure of Example 26 was repeated except that octadecylsulfonic acid was substituted for the hexylsulfonic acid. Similar results were obtained.

EXAMPLE 29

280 g. of dimethylsiloxane cyclics, 16 g. of butylnaphthalenesulfonic acid and 504 g. of water were mixed and then homogenized at 4000 p.s.i. The emulsified siloxanes were then polymerized at 75° C. A good emulsion showing no separation was formed. After 1 day of polymerization the viscosity of the resulting siloxane polymer was about 15,500 cps. and after 7 days the viscosity of the polymer was about 16,500 cps.

EXAMPLE 30

The procedure of Example 29 was repeated except that nonylnaphthalenesulfonic acid was substituted for butylnaphthalenesulfonic acid. After 1 day of polymerization the viscosity of the resulting siloxane polymer was about 18,750 cps. and after 7 days the viscosity of the polymer was about 21,850 cps.

EXAMPLE 31

280 g. dimethylsiloxane cyclics, 492 g. of water and 28 g. of a solution containing 40% solids of

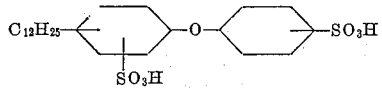

were mixed and then homogenized at 4000 p.s.i. The emulsified siloxanes were then polymerized for 24 hours at 70° C. The viscosity of the resulting siloxane polymer was about 25,000 cps.

EXAMPLE 32

When the surface active sulfonic acids listed below are substituted for the catalysts of Examples 20–31, similar results are obtained.

$(CH_3)_3SiC_{10}H_{20}SO_3H$
$(CH_3)_3SiC_{12}H_{24}SO_3H$
$(C_2H_5)_3SiC_{14}H_{28}SO_3H$

That which is claimed is:

1. A method which comprises polymerizing and copolymerizing
   (1) at least one member selected from the group consisting of organosiloxanes of the unit formula $R_nSiO_{4-n/2}$, in which R is selected from the group consisting of hydrogen atoms, monovalent hydrocarbon radicals and monovalent halohydrocarbon radicals and n has an average value of from 0.5 to less than 3 and silcarbanes having the general formula $HO(R)_2SiQSi(R)_2OH$ wherein R is selected from the group consisting of hydrogen atoms, monovalent hydrocarbon radicals and monovalent halohydrocarbon radicals and Q is a divalent radical attached to both silicon atoms via a silicon-carbon bond, said Q being selected from the group consisting of radicals composed of carbon and hydrogen atoms and radicals composed of carbon, hydrogen and oxygen atoms, there being less than 15 carbon atoms in said Q radical and any oxygen that is present being in the form of ether linkages, by polymerizing said member, in an aqueous medium while in a dispersed state, in the presence of
   (2) a compound of the formula $R'C_6H_4SO_3H$ wherein R' is a monovalent aliphatic hydrocarbon radical of at least 6 carbon atoms, as the primary catalyst for the polymerization,
until the desired increase in molecular aggregation is obtained.

2. The method of claim 1 wherein the member (1) is an organosiloxane.

3. The method of claim 2 wherein R' averages 12 carbon atoms.

4. The method of claim 2 wherein n averages about 2.

5. The method of claim 1 wherein the member (1) is a silcarbane.

6. The method of claim 5 wherein R' averages 12 carbon atoms.

7. The method of claim 1 wherein the member (1) is a mixture of an organosiloxane and a silcarbane.

8. The method of claim 7 wherein R' averages 12 carbon atoms.

9. The method of claim 8 wherein n averages about 2.

10. A method of preparing emulsions of organosiloxanes which comprises polymerizing and copolymerizing
    (1) at least one member selected from the group consisting of organosiloxanes of the unit formula $R_nSiO_{4-n/2}$, wherein R is selected from the group consisting of hydrogen atoms, monovalent hydrocarbon radicals and monovalent halohydrocarbon radicals and n has an average value of from 0.5 to less than 3 and silcarbanes having the general formula $HO(R)_2SiQSi(R)_2OH$ wherein R is selected from the group consisting of hydrogen atoms, monovalent hydrocarbon radicals and monovalent halohydrocarbon radicals and Q is a divalent radical attached to both silicon atoms via a silicon-carbon bond, said Q being selected from the group consisting of radicals composed of carbon and hydrogen atoms and radicals composed of carbon, hydrogen and oxygen atoms, there being less than 15 carbon atoms in said Q radical and any oxygen that is present being in the form of ether linkages, by polymerizing said member, in an aqueous medium while in a dispersed state, in the presence of
    (2) a compound of the formula $R'C_6H_4SO_3H$ wherein R' is a monovalent aliphatic hydrocarbon radical of at least 6 carbon atoms, as the primary catalyst for the polymerization,
until the desired increase in molecular aggregation is obtained, and thereafter neutralizing compound (2).

11. The method of claim 10 wherein the member (1) is an organosiloxane.

12. The method of claim 11 wherein R' averages 12 carbon atoms.

13. The method of claim 11 wherein n has a value of about 2.

14. The method of claim 10 wherein the member (1) is a silcarbane.

15. The method of claim 14 wherein a filler is added after the compound (2) is neutralized.

16. The method of claim 15 wherein the filler is a silica filler.

17. The method of claim 14 wherein R' averages 12 carbon atoms.

18. The method of claim 10 wherein the member (1) is a mixture of an organosiloxane and a silcarbane.

19. The method of claim 18 wherein R' averages 12 carbon atoms.

20. The method of claim 18 wherein n averages about 2.

21. A method which comprises polymerizing
    (1) an organosiloxane essentially of the average formula

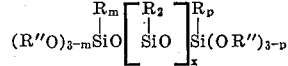

wherein each R is selected from the group consisting of hydrogen atoms, monovalent hydrocarbon radicals, and monovalent halohydrocarbon radicals, R" is a lower alkyl radical, m and p are each integers of from 0 to 3 inclusive, the sum of m and p being not greater than 5, and x has an average value of at least 7, while said siloxane is emulsified in an aqueous medium, in the presence of
    (2) a compound of the formula $R'C_6H_4SO_3H$ wherein R' is a monovalent aliphatic hydrocarbon radical of at least 6 carbon atoms, as the primary catalyst for the polymerization,
until the desired increase in molecular aggregation of the siloxane is obtained.

22. The method of claim 21 wherein R' averages 12 carbon atoms.

23. The method of claim 22 wherein the polymerized emulsion is neutralized and there is added thereto a filler.

24. The method of claim 23 wherein the filler is a silica filler.

25. The method of claim 24 in which a salt of the formula $R'C_6H_4SO_3Na$ is employed as an emulsifying agent, R' being a monovalent aliphatic hydrocarbon radical of at least 6 carbon atoms.

26. A method which comprises polymerizing and copolymerizing
    (1) at least one member selected from the group consisting of organosiloxanes of the unit formula $R_nSiO_{4-n/2}$, in which R is selected from the group consisting of hydrogen atoms, monovalent hydrocarbon radicals and monovalent halohydrocarbon radicals and n has an average value of from 0.5 to less than 3 and silcarbanes having the general formula

wherein R is selected from the group consisting of hydrogen atoms, monovalent hydrocarbon radicals and monovalent halohydrocarbon radicals, by polymerizing said member, in an aqueous medium while in a dispersed state, in the presence of
    (2) a compound of the formula $R'C_6H_4SO_3H$, wherein R' is a monovalent aliphatic hydrocarbon radical of at least 6 carbon atoms, as the primary catalyst for the polymerization, until the desired increase in molecular aggregation is obtained.

27. The method of claim 26 wherein R' averages 12 carbon atoms.

28. The method of claim 26 wherein $n$ averages about 2.

29. The method of claim 26 wherein the member (1) is a silcarbane.

30. The method of claim 29 wherein R' averages 12 carbon atoms.

31. The method of claim 29 wherein the catalyst is neutralized and a filler is added after the desired increase in molecular aggregation is obtained.

32. The method of claim 31 wherein the filler is a silica filler.

33. A method which comprises polymerizing

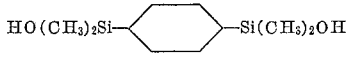

in an aqueous medium, in the presence of a catalyst of the formula $R'C_6H_4SO_3H$, wherein R' is a monovalent aliphatic hydrocarbon radical of at least 6 carbon atoms.

34. The method of claim 33 wherein R' averages 12 carbon atoms.

35. The method of claim 33 in which a salt of the formula $R'C_6H_4SO_3Na$ is employed as an emulsifying agent, R' being a monovalent aliphatic hydrocarbon radical of at least 6 carbon atoms.

36. The method of claim 33 wherein the catalyst is neutralized after the desired increase in molecular aggregation is obtained.

37. The method of claim 33 wherein the catalyst is neutralized and a filler is added after the desired increase in molecular aggregation is obtained.

38. The method of claim 37 wherein the filler is a silica filler.

39. A method which comprises copolymerizing

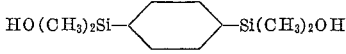

and organosiloxanes of the unit formula $R_nSiO_{4-n/2}$, in which R is selected from the group consisting of hydrogen atoms, monovalent hydrocarbon radicals and monovalent halohydrocarbon radicals and $n$ has an average value of from 0.5 to less than 3, in an aqueous medium, in the presence of a catalyst of the formula $$R'C_6H_4SO_3H$$

wherein R' is a monovalent aliphatic hydrocarbon radical of at least 6 carbon atoms.

40. The method of claim 39 wherein R' averages 12 carbon atoms.

41. The method of claim 39 in which a salt of the formula $R'C_6H_4SO_3Na$ is employed as an emulsifying agent, R' being a monovalent aliphatic hydrocarbon radical of at least 6 carbon atoms.

42. The method of claim 39 wherein the catalyst is neutralized after the desired increase in molecular aggregation is obtained.

43. The method of claim 39 wherein the catalyst is neutralized and a filler is added after the desired increase in molecular aggregation is obtained.

44. The method of claim 43 wherein the filler is a silica filler.

45. A method for preparing hexaphenylcyclotrisiloxane which comprises polymerizing diphenylsilanediol in the presence of a surface active sulfonic acid selected from the group consisting of the aliphatically substituted benzenesulfonic acids containing at least six carbon atoms in the aliphatic substituents, the aliphatically substituted naphthalenesulfonic acids containing at least four carbon atoms in the aliphatic substituents, the aliphatic sulfonic acids containing at least six carbon atoms in the aliphatic substituent, the silylalkylsulfonic acids containing at least six carbon atoms in the alkyl substituent, and the aliphatically substituted diphenylethersulfonic acids containing at least six carbon atoms in the aliphatic substituents, as the primary polymerization catalyst.

46. The method of claim 45 wherein the catalyst has the general formula $R'C_6H_4SO_3H$ wherein R' is a monovalent aliphatic hydrocarbon radical of at least 6 carbon atoms.

47. The method of claim 46 wherein R' averages 12 carbon atoms.

48. An aqueous emulsion of a polymer containing the unit formula

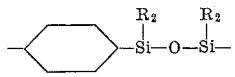

wherein R is a member selected from the group consisting of hydrogen atoms, monovalent hydrocarbon radicals and monovalent halohydrocarbon radicals.

49. The aqueous emulsion of claim 48 wherein each R is a member independently selected from the group consisting of the methyl, ethyl, vinyl, phenyl and 3,3,3-trifluoropropyl radicals.

50. An aqueous emulsion of a polymer containing the unit formula

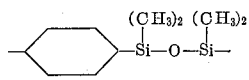

51. A method which comprises polymerizing and copolymerizing (1) at least one member selected from the group consisting of organosiloxanes of the unit formula $R_nSiO_{4-n/2}$ in which R is selected from the group consisting of hydrogen atoms, monovalent hydrocarbon radicals and monovalent halohydrocarbon radicals and $n$ has an average value of from 0.5 to less than 3, and silcarbanes having the general formula $HO(R)_2SiQSi(R)_2OH$ wherein R is selected from the group consisting of hydrogen atoms, monovalent hydrocarbon radicals and monovalent halohydrocarbon radicals and Q is a divalent radical attached to both silicon atoms via a silicon-carbon bond, said Q being selected from the group consisting of radicals composed of carbon and hydrogen atoms and radicals composed of carbon, hydrogen and oxygen atoms, there being less than 15 carbon atoms in said Q radical and any oxygen that is present being in the form of ether linkages, by polymerizing said member in an aqueous medium while in a dispersed state in the presence of (2) a surface active sulfonic acid selected from the group consisting of the aliphatically substituted benzene-sulfonic acids containing at least six carbon atoms in the aliphatic substituents, the aliphatically substituted naphthalenesulfonic acids containing at least four carbon atoms in the aliphatic substituents, the aliphatic sulfonic acids containing at least six carbon atoms in the aliphatic substituent, the silylalkylsulfonic acids containing at least six carbon atoms in the alkyl substituents, and the aliphatically substituted diphenylethersulfonic acids containing at least six carbon atoms in the aliphatic substituents, as the primary polymerization catalyst, until the desired increase in molecular aggregation is obtained.

References Cited by the Examiner

UNITED STATES PATENTS

| 2,562,000 | 7/1951 | Sveda | 260—46.5 |
| 2,567,854 | 9/1951 | Nixon | 260—505 |
| 2,891,920 | 6/1959 | Hyde et al. | 260—29.2 |
| 3,175,993 | 3/1965 | Weyenberg | 260—46.5 |

FOREIGN PATENTS 665,479  1/1952  Great Britain.

MURRAY TILLMAN, *Primary Examiner.*

J. C. BLEUTGE, *Assistant Examiner.*